US006967568B2

(12) United States Patent  
Ervin

(10) Patent No.: US 6,967,568 B2  
(45) Date of Patent: Nov. 22, 2005

(54) REAR TURNING SIGNAL SENSOR

(76) Inventor: Cheryl P. Ervin, 1500 Pine Valley, Ann Arbor, MI (US) 48104

( * ) Notice: Subject to any disclaimer, the term of this patent is extended or adjusted under 35 U.S.C. 154(b) by 13 days.

(21) Appl. No.: 10/655,507

(22) Filed: Sep. 5, 2003

(65) Prior Publication Data

US 2005/0062591 A1    Mar. 24, 2005

(51) Int. Cl.[7] .............................. B60Q 1/00
(52) U.S. Cl. .................. 340/435; 340/436; 340/475; 340/903
(58) Field of Search .............. 340/435, 436, 340/475, 903

(56) References Cited

U.S. PATENT DOCUMENTS

| 4,500,977 | A | 2/1985 | Gelhard | 367/108 |
|---|---|---|---|---|
| 4,626,850 | A | 12/1986 | Chey | 340/903 |
| 4,694,295 | A | 9/1987 | Miller et al. | 340/903 |
| 4,706,195 | A | 11/1987 | Yoshino et al. | 374/426 |
| 4,833,469 | A | 5/1989 | David | 340/901 |
| 4,916,450 | A | 4/1990 | Davis | 342/71 |
| 4,937,796 | A | 6/1990 | Tendler | 367/116 |
| 5,229,975 | A | 7/1993 | Truesdell et al. | 357/107 |
| 6,211,778 | B1 * | 4/2001 | Reeves | 340/436 |
| 6,812,833 | B2 * | 11/2004 | Rothkop et al. | 340/475 |
| 2002/0180595 | A1 * | 12/2002 | Flick | 340/435 |
| 2004/0090317 | A1 * | 5/2004 | Rothkop | 340/435 |

* cited by examiner

*Primary Examiner*—Jeffery Hofsass  
*Assistant Examiner*—Anne V. Lai  
(74) *Attorney, Agent, or Firm*—Barbara M. Burns

(57) ABSTRACT

The invention is a sensing and indicating device for determining the presence of a second vehicle near to a first vehicle and indicating the presence of the second vehicle. A sensor is positioned and electrically connected between the light socket and the light bulb contained within a light assembly and protected by a lens. The sensor transmits to an indicator adjacent the operator of the first vehicle, by a visual indication in the operator's sight or by an audio indicator. The sensor can be replaced, transferred to another vehicle or retrofitted to a vehicle.

14 Claims, 2 Drawing Sheets

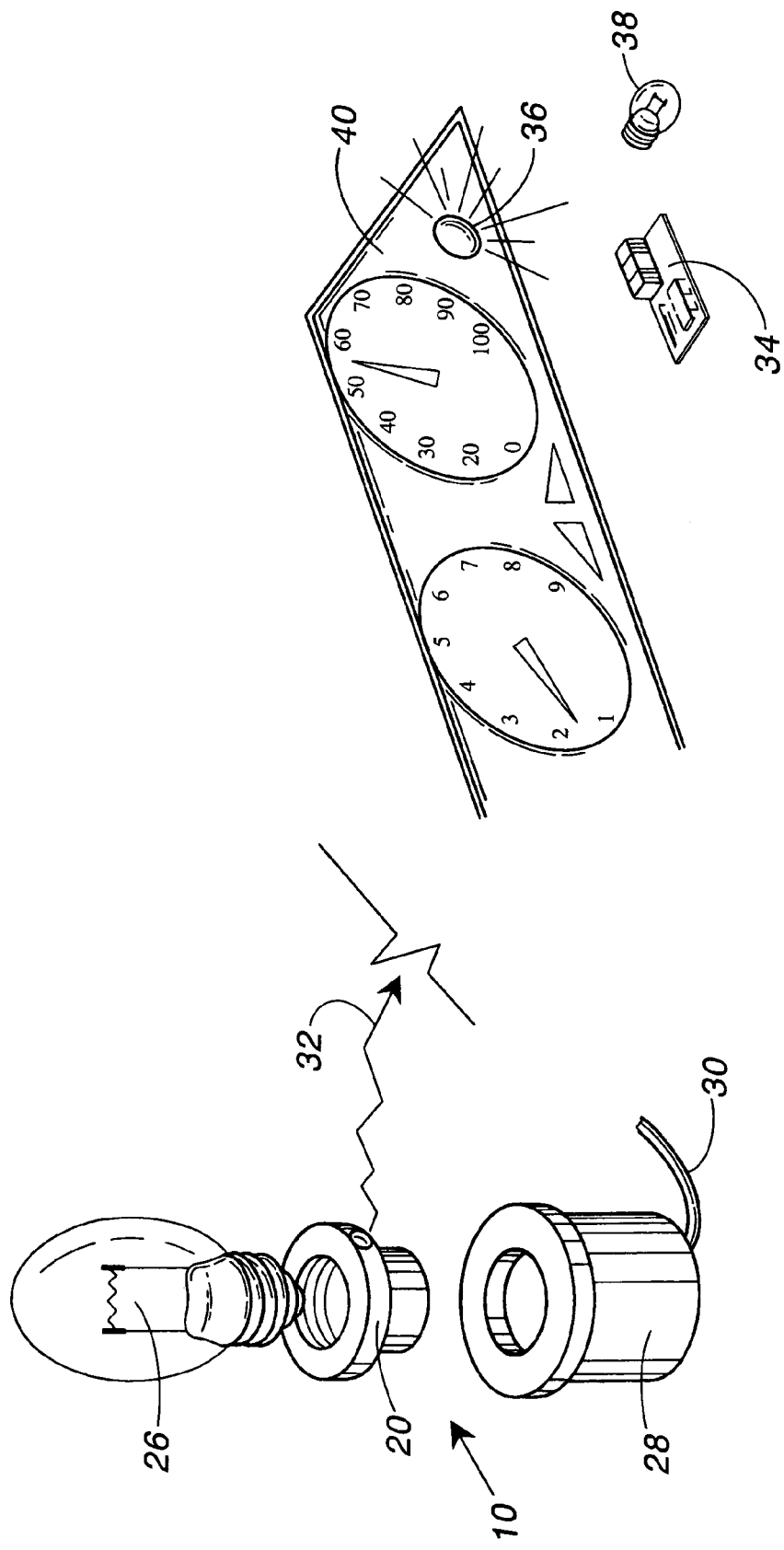

REAR TURNING SIGNAL SENSOR

BACKGROUND OF THE INVENTION

The field of the invention pertains to vehicles and in particular to the information available to an operator of the vehicle prior to initiating a turn or a lane change. Sometimes, a "blind spot" exists and another vehicle may be in the "blind spot" and not be observable to the operator. In the past, information was primarily visual and the information was gathered by the operator's visual checking of the inside and outside rear view mirrors and perhaps by the operator turning his head from a forward position and glancing behind the vehicle. However, in the time that the operator returned his head back to the forward position, another vehicle could enter the space that the operator thought to be clear and available for his vehicle to enter. This was not very satisfactory and a better solution to this problem was needed.

SUMMARY OF THE INVENTION

The invention is a device having a sensor that warns an operator of a vehicle of the presence of another vehicle in a location into which the operator desires to direct his vehicle. The sensor relays information to an indicator to the operator of the vehicle to facilitate decision making by the operator of the vehicle. However, it is imperative that the operator of the vehicle always make a visual check of the scene before executing a course change for the vehicle.

The sensor is mounted in a light assembly on a vehicle. A light assembly generally contains a light bulb and a powered light bulb socket to deliver power to the light bulb. A lens cover covers the light bulb and socket. Thus, the invention is operable with existing light assemblies.

The sensor is mounted to the light bulb socket and the light bulb fits to the sensor. The power to the light bulb is employed to operate the sensor. The sensor can be a proximity or a presence sensor set to recognize a second vehicle within a prescribed distance from the vehicle. The sensor has a transmitter that transmits the presence of an object (vehicle) in the prescribed space.

The device can be connected wirelessly from the sensor to the indicator through a receiver. The transmission by the transmitter is directed to a receiver card to trigger an indicator near to the operator of the vehicle. The indicator can be a light bulb located on the dash panel of the vehicle. The indicator of a vehicle present in the designated space can be shown by lighting the indicator light bulb. Alternately, an audible signal of vehicle presence can be given using a signal that can be discerned aurally.

The invention can be transferable to another vehicle. The sensor is merely removed from the light socket and the light bulb attached to the sensor is replaced to the light bulb socket. The indicator can be transferable also. The device can be engineered as original equipment and can also be retrofitted to existing vehicles. Consequently, users can add this invention their vehicles.

It is advantageous to the operator of the vehicle to have a rear turning signal sensor such as this invention to limit potential engagement with another vehicle.

It should be noted that the device of the invention provides rapid easily understandable information to the operator of the vehicle. This rapid access affords the operator with the ability to monitor and make decisions quickly and accurately. Minimal analysis is required of the operator.

For a more complete understanding of the present invention, reference is made to the following detailed description when read with in conjunction with the accompanying drawings wherein like reference characters refer to like elements throughout the several views, in which:

BRIEF DESCRIPTION OF THE DRAWINGS

FIG. 2 illustrates an exploded view of a the sensor of the device located between the light bulb and the light bulb socket of a light assembly; and FIG. 3 illustrates the receiver and an indicator for the device.

DESCRIPTION OF THE PREFERRED EMBODIMENTS

Figure 1:
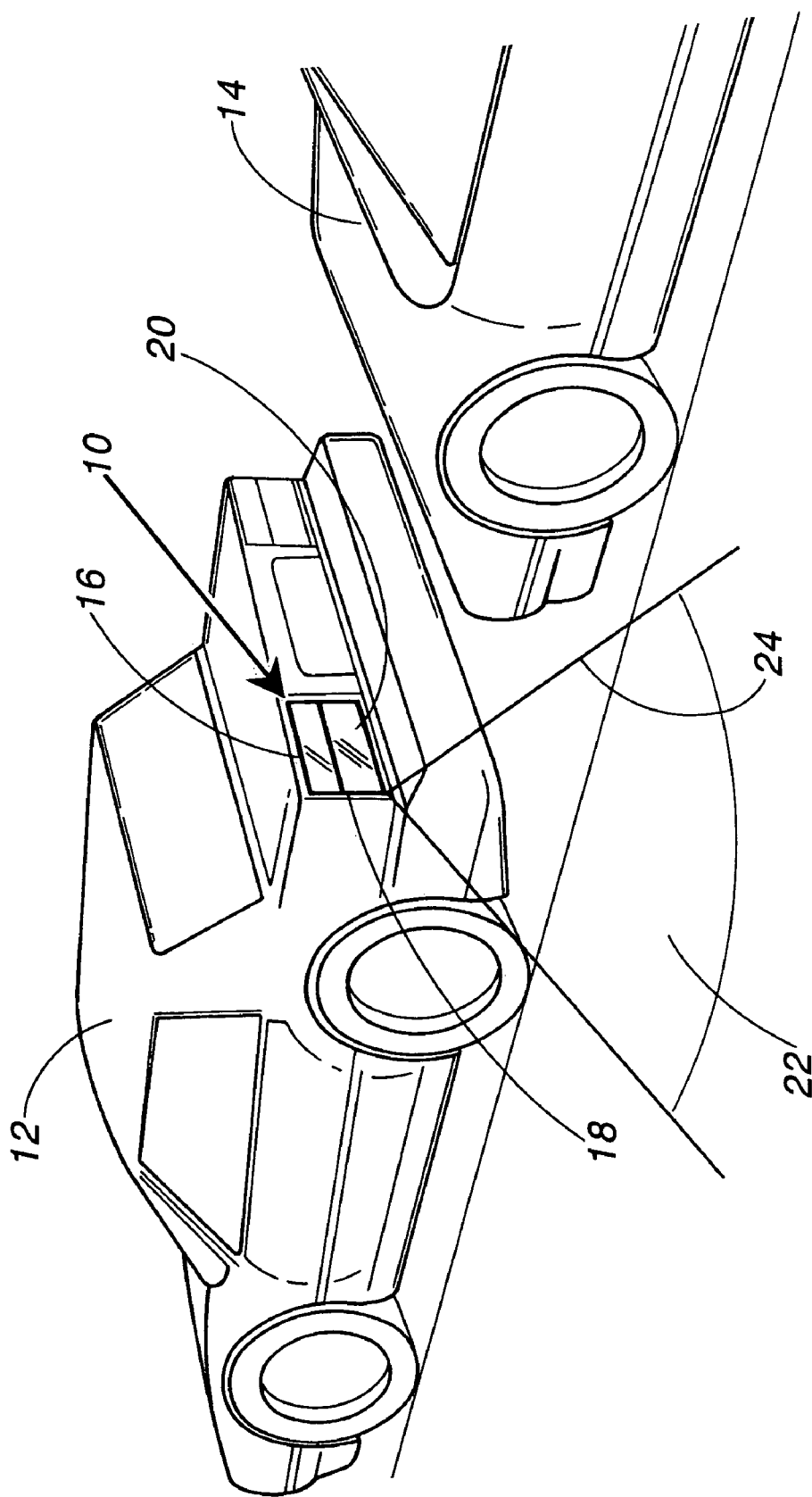
FIG. 1 illustrates an environmental view of the device positioned to a rear taillight of a vehicle.

Now turning to the drawings, the device 10 for a vehicle 12 for sensing and indicating a second vehicle 14 is thereshown in FIGS. 1 through 3.

First vehicle 12 and second vehicle 14 are shown in FIG. 1. First vehicle 12 has a tail light lens 16 covering a light assembly 18 into which device 10 of the invention is mounted. Light assembly 18 contains turning signal light controlled by operator of vehicle 12. Sensor 20 (better shown in FIG. 2. is set to recognize second vehicle 14 as being within a defined area 22 that is a prescribed distance 24 from first vehicle 12.

Now turning to FIG. 2, sensor 20 is depicted as electrically and mechanically connectable between light bulb 26 and light bulb socket 28. As tuning signal light of vehicle 12 is operated, power flows through power connection 30 to light bulb socket 28 and thus power flows to sensor 20 and through sensor 20 to light bulb 26.

Sensor 20 senses presence or proximity of another vehicle 14 within the defined area 22. Sensor 20 transmits signal 32 indicating presence to receiver 34 (FIG. 3). Receiver 34 triggers indicator 36. Indicator 36 is hereshown as light bulb 38 disposed on dash panel 40 of first vehicle 12.

What is claimed is:

1. A device for a vehicle for sensing and indicating a second vehicle is present, the device comprising a sensor for sensing a second vehicle as being present in a space near to the vehicle, the sensor adapted for use with a light socket for a light bulb for a turning signal, the light socket having a power source, the sensor being powered by the power source of the light socket when the light bulb is operated by the turn signal, the sensor adapted to hold a light bulb, wherein as the turning signal is operated by the operator of the vehicle to indicate a desired change of direction for the vehicle, the power to the light bulb operates the sensor whereby the sensor determines a second vehicle is within range and the sensor transmits a signal to an indicator located adjacent to an operator of the vehicle, the indicator indicating a second vehicle is present within the space.

2. The device according to claim 1 for a vehicle for sensing and indicating a second vehicle is present in a space near to the vehicle, the device comprising a proximity sensor.

3. The device according to claim 1 for a vehicle for sensing and indicating a second vehicle is present in a space near to the vehicle, the device sensing behind and to the side of the vehicle.

4. The device according to claim 1 for a vehicle for sensing and indicating a second vehicle is present in a space near to the vehicle, wherein the sensor of the device fits into a socket for a light bulb and the light bulb fits into the sensor.

5. The device according to claim 1 for a vehicle for sensing and indicating a second vehicle is present in a space near to the vehicle, the device further comprising a receiver card for receiving the signal from the sensor.

6. The device according to claim 5 for a vehicle for sensing and indicating a second vehicle is present in a space near to the vehicle, the device further comprising an indicator connected with the receiver card, the indicator indicates the presence of a second vehicle.

7. The device according to claim 6 for a vehicle for sensing and indicating a second vehicle is present in a space near to the vehicle, wherein the indicator being a visual indicator.

8. The device according to claim 7 for a vehicle for sensing and indicating a second vehicle is present in a space near to the vehicle, wherein the visual indicator being a light bulb operable to generate light.

9. The device according to claim 6 for a vehicle for sensing and indicating a second vehicle is present in a space near to the vehicle, wherein the indicator being an audible indicator operable to generate a sound.

10. The device according to claim 1 for a vehicle for sensing and indicating a second vehicle is present in a space near to the vehicle, the device further comprising wireless transmission from the sensor to the receiver card for receiving the signal from the sensor.

11. The device according to claim 1 for a vehicle for sensing and indicating a second vehicle is present in a space near to the vehicle, wherein the indicator located adjacent to an operator of the vehicle being located on a dash of the vehicle.

12. The device according to claim 1 for a vehicle for sensing and indicating a second vehicle is present in a space near to the vehicle, wherein the sensor being transferable to another vehicle.

13. The device according to claim 1 for a vehicle for sensing and indicating a second vehicle is present in a space near to the vehicle, wherein the space near to a vehicle being set by the sensor.

14. The device according to claim 1 for a vehicle for sensing and indicating a second vehicle is present in a space near to the vehicle, wherein the sensor being positioned between a light socket and a light bulb, the sensor being protected by a lens covering the light bulb.

* * * * *